UNITED STATES PATENT OFFICE.

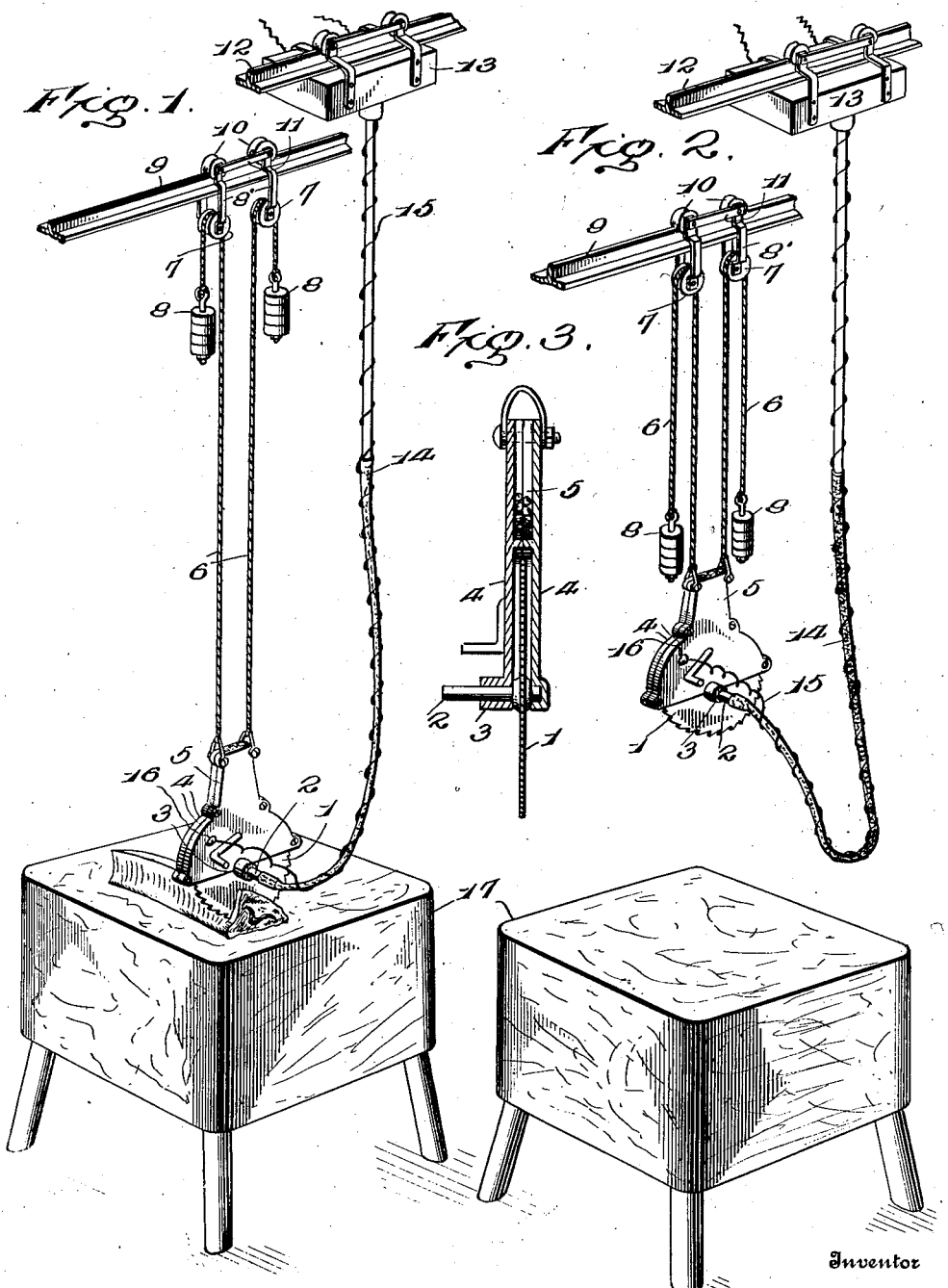

TONY A. TUBBS, OF TREADWELL, DISTRICT OF ALASKA.

BUTCHER'S SAW.

No. 909,716.　　　　Specification of Letters Patent.　　　Patented Jan. 12, 1909.

Application filed February 29, 1908. Serial No. 418,503.

*To all whom it may concern:*

Be it known that I, TONY A. TUBBS, residing at Treadwell, District of Alaska, have invented certain new and useful Improvements in Butchers' Saws, of which the following is a specification.

My invention relates to an improvement in butchers' saws, and it has for its object the substitution for the ordinary hand-saw employed by butchers in the sawing of bones in the cutting of meat, of a power-driven saw for this purpose, whereby time and labor will be saved in such work.

A further object of my invention is the provision of a power-driven saw for this purpose which is so mounted as to enable it to be quickly and easily adjusted over the butcher's block and to be as readily and quickly raised from its working position when out of use.

To these ends my invention consists in the details of construction and combination of parts hereinafter described and claimed.

In the accompanying drawing forming a part of this specification Figure 1 is a perspective view illustrating my improved power-driven saw in working position; Fig. 2 is a similar view showing the same in raised position, and Fig. 3 is a vertical cross sectional view through the saw and its housing.

1 represents a circular saw mounted on a shaft 2 in a housing or bearing 3 made in two parts 4, 4, semi-circular in shape and covering approximately one-half the area of the diameter of the saw 1. The housing or bearing 3 is provided with an upwardly extending hollow portion 5 to which is attached a wire rope 6 extending over a pair of pulleys 7, 7, the free ends of said ropes being provided with counter weights 8, 8, the pulley 7 mounted on brackets 8, 8, extending over a track 9, provided at their upper ends with track wheels 10 and a connecting arm 11. Above the track 9 there is provided a second track 12 on which is adjustably mounted an electric motor 13 from which extends a flexible shaft 14, which is connected at its lower end to the shaft 2 of the saw 1. A wire 15 extends from the saw to the motor and is provided adjacent to the saw shaft with a switch 16, whereby the motor may be turned on or off as desired.

In the operation of my improved saw the meat is placed by the butcher on the block 17, and is cut at the desired point by the use of the butcher's knife, in the ordinary manner, until the bone therein is reached. The saw 1 is then drawn down until the edge thereof is in contact with the bone to be severed, and the switch 16 is then turned, thus turning on the electric current and causing the saw to be revolved, thus quickly severing the bone at the points desired. As the counter weights 8 balance the weight of the saw and its supporting housing 3, the further lowering of the saw as it cuts through the bone is readily effected, and when the operation is completed the current is quickly turned off, and the saw easily thrown up above the block and out of operative position. Shot or other small weights may be dropped into the hollow housing to insure an exact balance of the parts.

While I have described what I believe to be the preferred embodiment of my invention, yet I do not wish to be limited thereto, as I am aware that changes may be made in the various details and combinations without material departure from the spirit of my invention.

I claim:

In an apparatus for butchers' use in severing the bones in meat, the combination with a track rail, of a support comprising a pair of wheels adapted to run on the track, and a pair of pulleys supported below the track, a housing, a circular saw mounted in the housing, cables extending from the upper portion of the housing over the pulleys below the track, counter weights on the free ends of the cables, a second track mounted adjacent to the first track, and an electric motor provided with wheels adapted to run on said second track whereby said motor is supported, and a flexible shaft extending from the motor to the saw.

In testimony whereof I affix my signature in presence of two witnesses.

TONY A. TUBBS.

Witnesses:
H. FIDDY,
JOHN HENSON.